(12) United States Patent
Patel

(10) Patent No.: US 6,768,973 B1
(45) Date of Patent: Jul. 27, 2004

(54) METHOD FOR FINDING SOLUTIONS

(75) Inventor: Shail Patel, Wirral (GB)

(73) Assignee: Unilever Home & Personal Care USA, division of Conopco, Inc., Greenwich, CT (US)

(*) Notice: Subject to any disclaimer, the term of this patent is extended or adjusted under 35 U.S.C. 154(b) by 719 days.

(21) Appl. No.: 09/691,803

(22) Filed: Oct. 19, 2000

(30) Foreign Application Priority Data

Apr. 12, 2000 (EP) .............................................. 00303083

(51) Int. Cl.[7] .............................................. G06F 17/10
(52) U.S. Cl. .................. 703/2; 700/28; 705/7
(58) Field of Search ............................. 703/2; 705/7, 8; 706/21, 19; 700/28, FOR 102

(56) References Cited

U.S. PATENT DOCUMENTS

| | | |
|---|---|---|
| 5,222,192 A | 6/1993 | Shaefer |
| 5,390,282 A | 2/1995 | Koza et al. |
| 5,394,509 A | 2/1995 | Winston |
| 5,630,070 A | 5/1997 | Dietrich et al. |
| 5,719,794 A | 2/1998 | Altshuler et al. |
| 5,734,796 A | 3/1998 | Pao |
| 5,809,490 A | 9/1998 | Guiver et al. |
| 5,848,402 A | 12/1998 | Pao et al. |
| 5,853,377 A | 12/1998 | Madsen et al. |
| 5,903,474 A | 5/1999 | Sadler et al. |
| 5,926,803 A | 7/1999 | Kitano |
| 5,930,762 A * | 7/1999 | Masch .......................... 705/7 |
| 5,940,816 A * | 8/1999 | Fuhrer et al. ................. 706/13 |
| 6,459,425 B1 * | 10/2002 | Holub et al. ................ 345/207 |
| 6,490,572 B2 * | 12/2002 | Akkiraju et al. .............. 706/19 |

FOREIGN PATENT DOCUMENTS

| | | |
|---|---|---|
| EP | 0 460 037 B1 | 12/1991 |
| EP | 0 581 273 A1 | 2/1994 |
| EP | 0 831 405 A2 | 3/1998 |
| EP | 0 927 944 A1 | 7/1999 |
| WO | 90/09831 | 7/1990 |
| WO | 96/24033 | 8/1996 |
| WO | 97/20076 | 6/1997 |
| WO | 98/13776 | 2/1998 |

OTHER PUBLICATIONS

Churchman et al., Introduction to Operations Research, 1957, John Wiley & Sons, pp. 304–317*
European Search Report EP 00 30 3103 dated Oct. 6, 2000, 2 pp.
"Optimizing Product Formulations Using Neural Networks", *Scientific Computing & Automation*, (Sep. 1992), pp. 19–26.
"Multicriteria steepest ascent in a design space consisting of both mixture and process variables", *Chemometrics and Intelligent Laboratory Systems 30*, (1995) pp. 23–36.

* cited by examiner

Primary Examiner—Albert W. Paladini
(74) Attorney, Agent, or Firm—Alan Bornstein

(57) ABSTRACT

A method is described for using a computer in finding solutions to a problem dependent on a number of criteria. A model algorithm is provided for each of the criteria, each model algorithm providing a prediction for a corresponding criteria when a candidate solution is inputted into the model algorithm. At least one model algorithm provides a prediction with a prediction error bar for the corresponding criteria. Criteria are selected to optimise a set of candidate solutions. An algorithm is provided for optimisation of the set of candidate solutions in accordance with the selected criteria. A first set of candidate solutions is provided and the optimisation algorithm generates one or more new candidate solutions. All candidate solutions are inputted into the number of model algorithms to obtain predictions and at least one prediction error bar. Information of the set of candidate solutions obtained by the generation and/or previous optimisations and/or experiments is used to select candidate solutions from the set to obtain an optimised set of candidate solutions.

19 Claims, 7 Drawing Sheets

METHOD FOR FINDING SOLUTIONS

The present invention relates to a method for finding solutions to a problem dependent on a number of criteria.

U.S. Pat. No. 5,940,816 discloses a method of this type using a set of solution generators, wherein the set of solution generators provides candidate solutions which are filtered to produce at least one candidate solution to the problem. This method is used to find solutions for transportation planning problems. Such a method shows the advantage of providing an enhanced understanding of the trade-offs inherent in the selection of a solution from a number of possible solutions. This known method however does not take into account the uncertainty of the data used.

The invention aims to provide an improved method for finding solutions to a problem dependent on a number of criteria.

According to the invention a method is provided for finding solutions to a problem dependent on a number of criteria, comprising the steps of
  (i) providing a model algorithm for each of the criteria, each model algorithm providing a prediction for a corresponding criteria when a candidate solution is inputted into the model algorithm and wherein at least one model algorithm provides a prediction with a prediction error bar for the corresponding criteria; and
  (ii) selecting criteria to optimise a set of candidate solutions;
  (iii) and providing an algorithm for optimisation of the set of candidate solutions in accordance with the selected criteria;
wherein a first set of candidate solutions is provided, wherein the optimisation algorithm generates one or more new candidate solutions, wherein all candidate solutions are inputted into the number of model algoritnms to obtain predictions and at least one prediction error bar, and wherein information of the set of candidate solutions obtained by said generation and/or previous optimisations and/or experiments is used to select candidate solutions from the set to obtain an optimised set of candidate solutions.

In this manner a method is obtained which is particularly suitable to solve real-life problems. The uncertainty in the data of candidate solutions is advantageously used in the optimisation algorithm to obtain the optimised set of candidate solutions. The error bar(s) can be used for example to guide the optimisation process to meet certain performance requirements. The method allows to examine candidate solutions to select candidate solutions for actual testing thereby reducing the efforts to do actual tests. In this manner a solution to a problem can be obtained at reduced cost and use of test materials and equipment, An advantageous application of the method is optimising manufacturing processes.

According to a preferred embodiment the method of the invention can include a number of iteration steps in a loop as follows:
  (i) a first set of one or more candidate formulations are used as starting point;
  (ii) candidate solutions are inputted into the number of model algorithms to obtain predictions whereby at least one prediction includes a prediction error bar; and
  (iii) the optimisation algorithm generates new candidate solutions; and
  (iv) the new candidate formulations are used as input into the number of model algorithms in iteration step (ii); and
wherein predictions and prediction error bars of the set of candidate solutions are used to select candidate solutions from the set to obtain an optimised set of candidate solutions.

Preferably candidate solutions are selected comprising predictions with minimum prediction error bars. In an embodiment of the method of the invention the predictions and/or prediction error bar(s) of the optimised set of candidate solutions are used to determine a region of an experimental space for carrying out further experiments.

In a preferred embodiment of the invention the optimisation process can be used for formulation optimisation.

For the purpose of the invention the term formulation optimisation refers to the fact that for a formulation the type of ingredients, their relative levels and the conditions of preparing the final formulation are chosen such that an desired end formulation is obtained.

For example an optimisation with reference to the type of ingredient may provide assistance is determining which choice out of a number of alternatives can be used. For example choice of emulsifiers, surfactants, thickeners etc.

An optimisation with reference to the relative level of ingredients may for example start from a list of ingredients and aim to find an optimised combination of those. For example the optimisation process may provide an indication of ratios of surfactant materials or fat mixtures in products.

An optimisation with reference to the conditions for preparing the final formulation may for example take into account processing conditions suchs as temperature, mixing speed, maturing times and aim to find optimal combinations of these.

Very often a formulation optimisation process in accordance to the invention will take into account more than one of the above elements. Preferred optimisation processes in according to the invention involve the optimisation with reference to the relative level of ingredients as described above. This may then optionally be combined with optimisation wrt to the type of ingredients and/or with reference to the manufacturing conditions.

The invention will be further explained by reference to the drawings in which an embodiment of the method of the invention is schematically shown.

FIG. 1 schematically shows a computer suitable for running a program to carry out an embodiment of the method of the invention.

FIG. 2 schematically shows a diagram of an embodiment of the invention.

In the following description an embodiment of a method for using a computer for optimising formulations against a number of criteria will be described. However, the method described can be applied in finding solutions to more general problems dependent on a number of criteria, in particular problems of such a type, whereby testing solutions requires test material and/or equipment, more particularly problems having a technical character such as optimising manufacturing processes. The specific example of optimising formulations is given without limiting the scope of the invention to optimising formulations.

In optimising formulations, the method described can for example be used for optimising formulations in the fields of detergents, food products, personal care products, fabric care products, household care products, beverages and the like.

Figure 1:
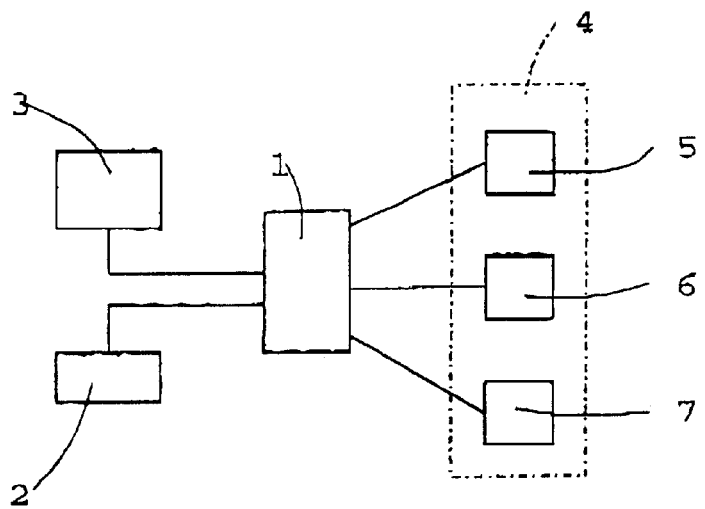

FIG. 1 schematically shows in a simplified manner a computer 1 having a keyboard 2 and a monitor 3 for user interaction with the program embodying the method described. Further the computer 1 comprises a memory 4 schematically indicated by a dashed line which may include both a hard disk memory and RAM memory. All model algorithms which can be used in carrying out the method are stored in a first part 5 of the memory, i.e. a model algorithm store 5. The model algorithms may be based on experimental data and/or physical/chemical knowledge. At least one of the model algorithms used may provide a prediction together with a prediction error bar on the input of a candidate formulation. The prediction error bar may be linear or non-linear. Such a model algorithm providing a prediction together with a prediction error bar may for example be a Bayesian neural network. More generally, model algorithms stored in the model algorithm store 5 can be neuro-fuzzy networks, neural networks, linear regression models, genetic function approximation, arithmetic models, etc.

As example of model algorithms stored in store 5 can be mentioned models providing predictions and, if applicable, prediction error bars on cost, molecular/mesoscale properties, such as micelle characteristics and product structure, material (physical/chemical) properties, such as detergency, foam height, bubble size, and rheological parameters, biological properties, such as toxicity, biodegradation, and antibacterial activity, sensory properties, such as foam sensory properties, slipperiness, crunchiness, and flow, and consumer perception properties, such as shine, clean, and overall liking.

The memory 4 further comprises a second part or optimisation algorithm store 6 for storing optimisation algorithms, including preferably a multi-criteria optimisation algorithm, in particular a Pareto optimal genetic optimisation algorithm also known as multi-objective genetic algorithm. Another example of a multi-criteria optimisation algorithm is a normal boundary intersect method. The optimisation algorithm store 6 may further comprise single-criteria optimisation algorithms, such as sequential quadratic programming or simplex method algorithms.

Finally the memory 4 comprises a candidate formulation store 7 for storing candidate formulations or more generally candidate solutions found as a result of running the optimisation method. During running the computer program embodying the method, a user can interact with the method through a suitable user interface.

Figure 2:
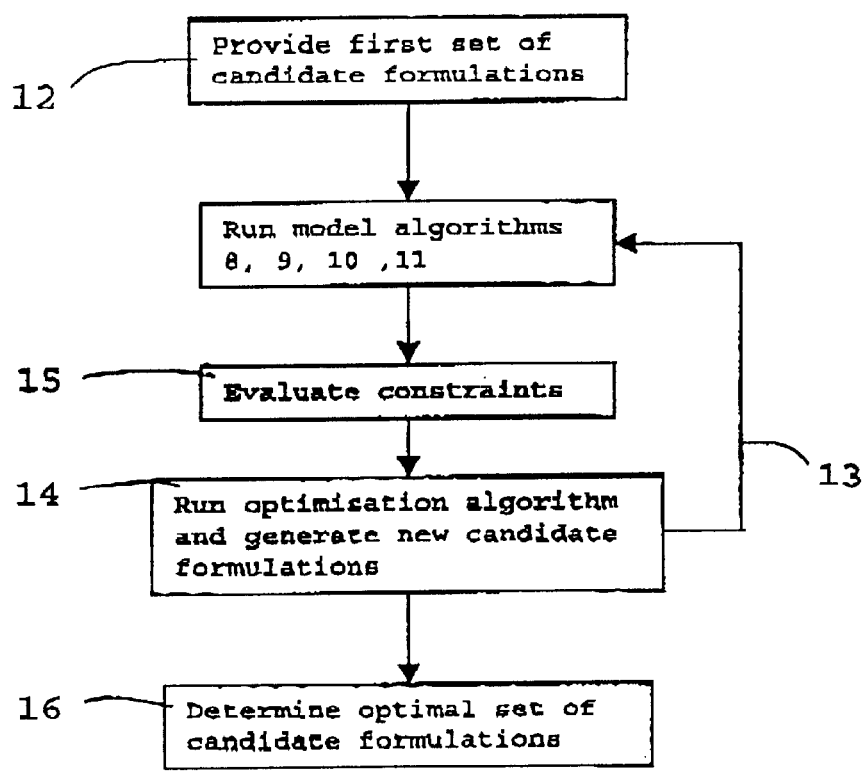

The method will be further described by means of the flow diagram shown in FIG. 2.

STEP I: Depending on the specific formulation optimisation, the user will have to select from the model algorithm store the model algorithms to be used in the method. The embodiment described relates to optimisation of a detergent formulation, wherein four model algorithms 8–11 are used. Model algorithm 8 is an arithmetic model providing a cost prediction. Model algorithm 9 is a Bayesian neural network providing predictions and prediction error bars on the foam properties of the detergent formulation. Model algorithm 10 is a Bayesian neural net providing a prediction and prediction error bar on mildness of the detergent formulation. Finally, model algorithm 11 is a model based on physical/chemical knowledge providing a prediction and prediction error bar on detergency of the detergent formulation.

STEP II: in a preferred embodiment of the invention a number of constraints can be defined or selected by the user in an interactive manner to constrain candidate formulations. These constraints may, for example be constraints in the formulation space, for example lower and upper boundaries on each formulation component. Such constraints may be determined by some model, for example a heuristic or rule-based processing model. Further constraints are combinations of variables in the formulation space. For example a simplex constraint $\Sigma x_1 = 1$ or $<1$, i.e., there should not be more than 100% of components in the formulation. Other constraints may be dependent on legislative or chemical requirements.

Further constraints can be defined or selected by the user in an interactive manner, which constraints apply to the predictions and/or prediction error bars, i.e. to the property space. Constraints are for example the requirement that error bars are less than some value and/or specific ranges for the property values.

STEP III: Before running the method, the optimisation algorithm must be selected from the optimisation algorithm store 6 and criteria to optimise on are defined. These criteria are for example predictions, prediction error bars, if applicable, whether to maximise or minimise. In the embodiment described a genetic algorithm is used to find an optimised set of candidate formulations. As an alternative a normal boundary intersect method can be used. According to the method described the genetic algorithm operates to optimise formulations against multiple criteria without requiring the user to provide weight factors or the like before running the optimisation method. In this manner a set of candidate formulations or solutions will be obtained. By examining the formulations the user of the method can see the trade-offs between criteria. In this manner the user can obtain relevant information at low cost as it is not necessary to prepare large numbers of different formulations for actual testing to determine the properties. By evaluating the information obtained, the user can decide on the actual formulations for further testing.

STEP IV: To start the optimisation, a first set of candidate formulations schematically shown at 12 in FIG. 2 is provided, which set of candidate formulations comprises at least one formulation. It is noted that the term set means a number of one or more formulations. The first set of candidate formulations may be a random set or may be obtained from previous actual formulations or may be the result of previous optimisations. According to a specific embodiment of the invention, a candidate formulation may be obtained by carrying out the method with a weighted optimisation, wherein the criteria to optimise on are weighted. Such a weighted optimisation results in one formulation and one or more of formulations obtained in this manner can be used as seeds for running the optimisation method with the multi-objective genetic algorithm without the use of weighted criteria.

STEP V With the first set of formulations 12 a number of iteration steps are carried out in an iteration loop as schematically indicated by line 13. The number of iteration steps can be preset at a given number N or can be random until convergence of generated formulations. The candidate formulations are provided as input to the model algorithms 8–11 as indicated by block 13 resulting in a number of predictions and/or prediction error bars. As indicated by block 14 the optimisation algorithm generates one or more new candidate formulations and forwards these new candidate formulations as input to the model algorithms 8–11. Block 15 indicates the use of the defined constraints in running the optimisation method.

Generation of new candidate formulations can either be done in a random manner or preferably using all or part of the information of the available candidate formulations, i.e. formulation components, predictions and prediction error bars, the gradients and estimated gradients of predictions and/or prediction error bars, the constraints, and generally any other, eg heuristic information available.

Preferably, the optimisation algorithm generates new candidate formulations with the object to improve the finally obtained set of candidate solutions. For example, the optimisation algorithm can be adapted to generate Pareto optimal candidate formulations.

In the step of generating new formulations it is preferred to tune the generation of new candidate formulations to the landscape character of formulations. The landscape of formulations is a smooth landscape, wherein in case of a genetic algorithm it is preferred to use a line search cross over operator for generating new candidate formulations. As an alternative for a line search cross-over operator it is possible to use a gradient decent algorithm to generate new candidate formulations. Further in general in the generation of new candidate formulations cross-over operators, inversion operators, mutation operators and clone operators could be used in the genetic algorithm.

STEP VI: In a final step 16 of the method described the Pareto optimum set of candidate formulations is selected from the set of formulations obtained through the iteration steps and/or obtained by any previous optimisations and/or by experiments, and by this selection an optimised set of candidate formulations is obtained. The set of candidate formulations obtained after the iterations steps may comprise newly generated candidate formulations and candidate formulations of the first set. The optimised set of candidate formulations can be stored in candidate formulations store 7 for further use.

Figure 5:
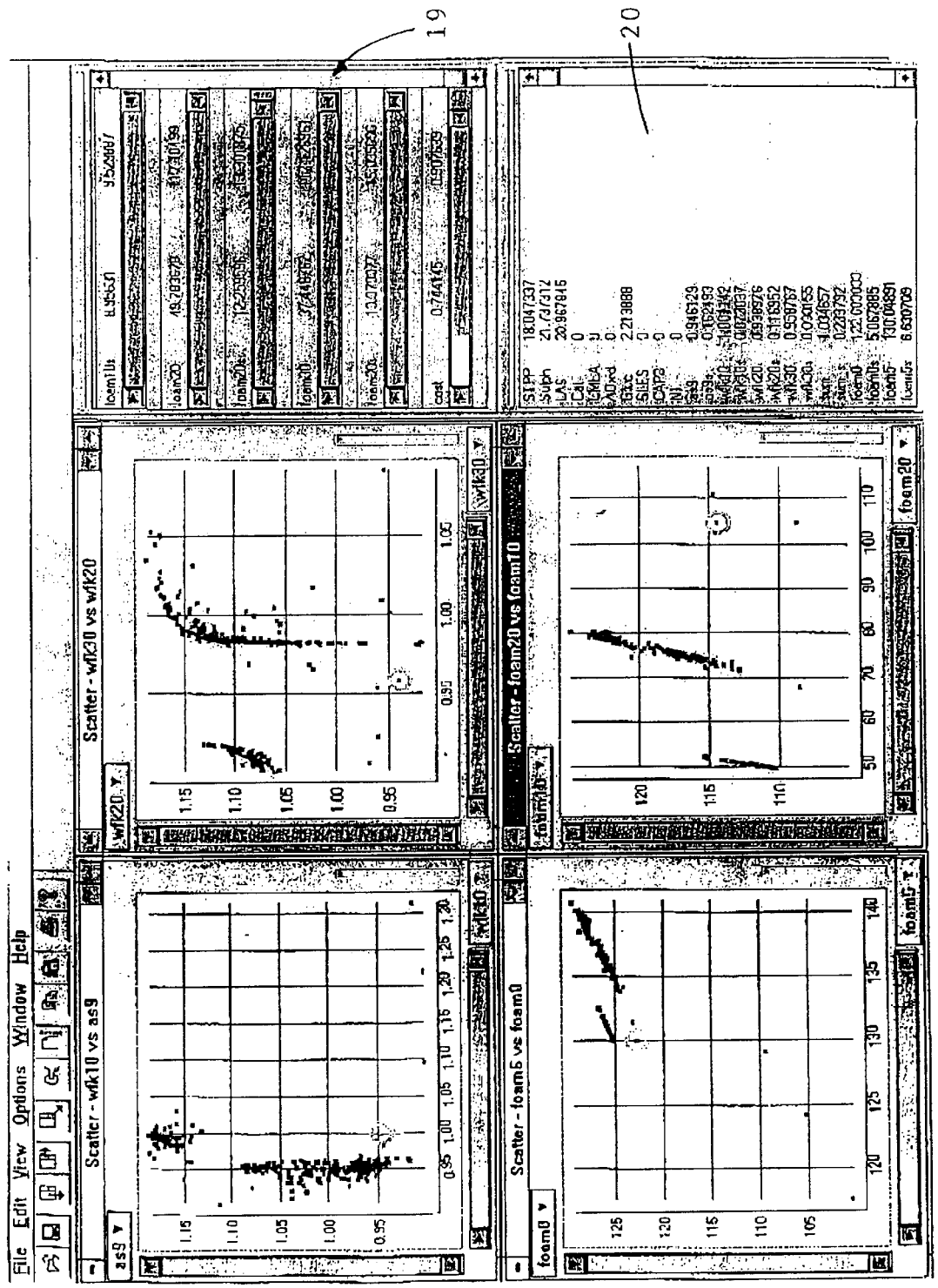
FIG. 5 shows a screen display showing a set of solutions obtained by means of the method of the invention.

The candidate formulations obtained as a result of the optimisation can be evaluated by visual inspection of the trade-offs between two or more criteria. FIG. 5 shows by way of example four windows each showing the set of optimised formulations against two criteria, i.e. in this case predicted detergency and foam. This visualisation can be used to interact in a dynamic manner with results of the optimisation. By moving slider bars 19 the constraints on the formulations and ranges of desired properties can be varied.

In the display example of FIG. 5, one formulation is highlighted and the predicted properties of these formulations are shown in window 20.

It is noted that evaluation of the results of the optimisation is possible by applying further constraints to filter the set of formulations obtained by the optimisation. Of course, chemical knowledge may also be used in evaluation.

Some of the candidate formulations can be selected to perform further experiments. The method of selection may be algorithmic, eg maximising the spread in the formulation space, and/or heuristic, eg use of chemical knowledge. Further experiments can be done using classical bench techniques or high throughput screening. The results obtained by the further experiments on actual formulations can be used to improve the model algorithm. This will result in the model algorithms providing more accurate predictions and if applicable more accurate prediction error bars.

Figure 3:
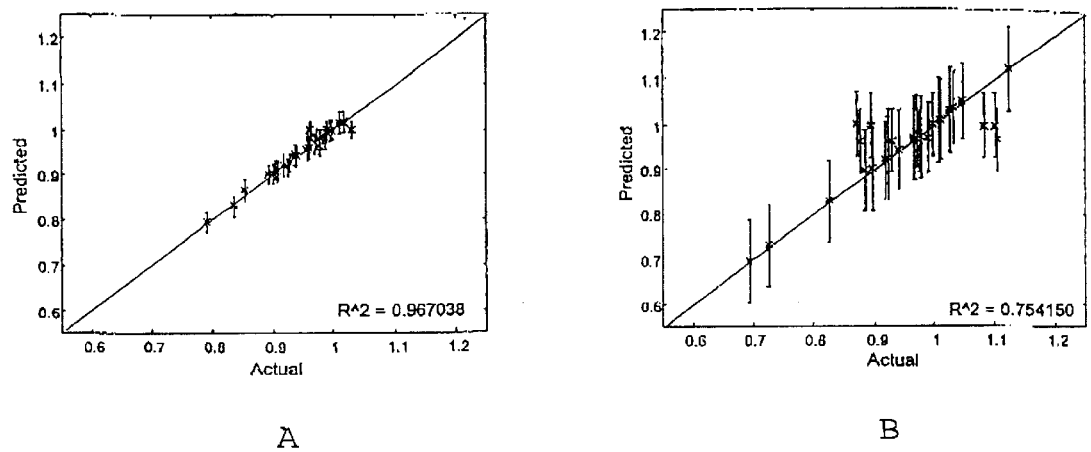
FIGS. 3 and 4 show graphs for explaining the method of the invention.

FIG. 3 shows by way of example the ability of a Bayesian neural network to model the noise in the data. The graphs shown in FIG. 3 show how the prediction error bars can vary significantly in the predictions of detergency on two typical test clothes A (FIG. 3A) and B (FIG. 3B). The larger error bars in FIG. 3B indicate a noisier data set. The graph indicates that the A test cloth has better quality control, whereas B suffers from a larger variation in cloth quality and response. More generally it can be seen that the use of error bars provides relevant information to the user in evaluating the predictions of candidate solutions and in deciding on the selection of candidate formulations for carrying out further tests.

Figure 4:
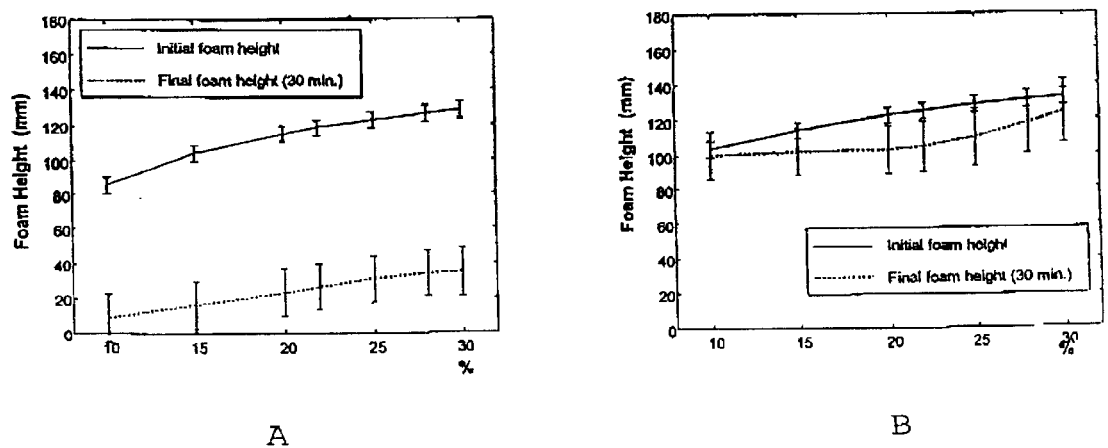

It is possible to investigate the effect of varying formulations by examining the predictions obtained from the model algorithms. FIG. 4 shows by way of example in case of a detergent formulation the effect of varying the surfactant level on foam height without (FIG. 4A) and with (FIG. 4B) a foam booster. FIG. 4B indicates that adding 3% foam booster will result in a more stable foam even at the lower surfactant levels.

As noted above, the optimisation method can also be used for example to optimise food product formulations, such as a margerine product. In the method model algorithms will be used for cost and solid fat content at different temperatures.

Although in the embodiment described the optimisation method uses an iteration loop comprising running the model algorithms and running the optimisation algorithm to generate new candidate formulations, it is possible to run the optimisation algorithm to generate new candidate formulations and to run the model algorithms afterwards to obtain predictions and, if applicable, prediction error bars and then use the defined constraints and select formulations using all available information to obtain an optimised set of formulations. Moreover it is not necessary to have a final selection step to obtain the optimised set if a Pareto or other optimisation is involved in generating new candidate formulations.

From the above it will be understood that the invention provides a method which is particularly suitable to solve real-life problems. The uncertainty in the data of candidate solutions is advantageously used in the optimisation algorithm to obtain the optimised set of candidate solutions. The error bar(s) can be used for example to guide the optimisation process to meet certain performance requirements. The method allows to examine candidate solutions to select candidate solutions for actual testing thereby reducing the efforts to do actual tests. In this manner a solution to a problem can be obtained at reduced cost and use of testing materials and equipment.

EXAMPLE

This example describes the method of the invention being applied to the formulation optimisation of a shower gel that is mild to the skin. A randon formulation of a shower gel comprising 2 surfactant materials (cosurfactant1 and cosurfactant 2) was used as the starting formultion.

Prediction algorithms for predicting mildness as a function of the level of the two ingredients were defined based on data was collected about how mildness varied for two ingredients and this was modelled using a Gaussian process model, The prediction algorithm also provided a value for the error bar in the prediction.

Figure 6A:
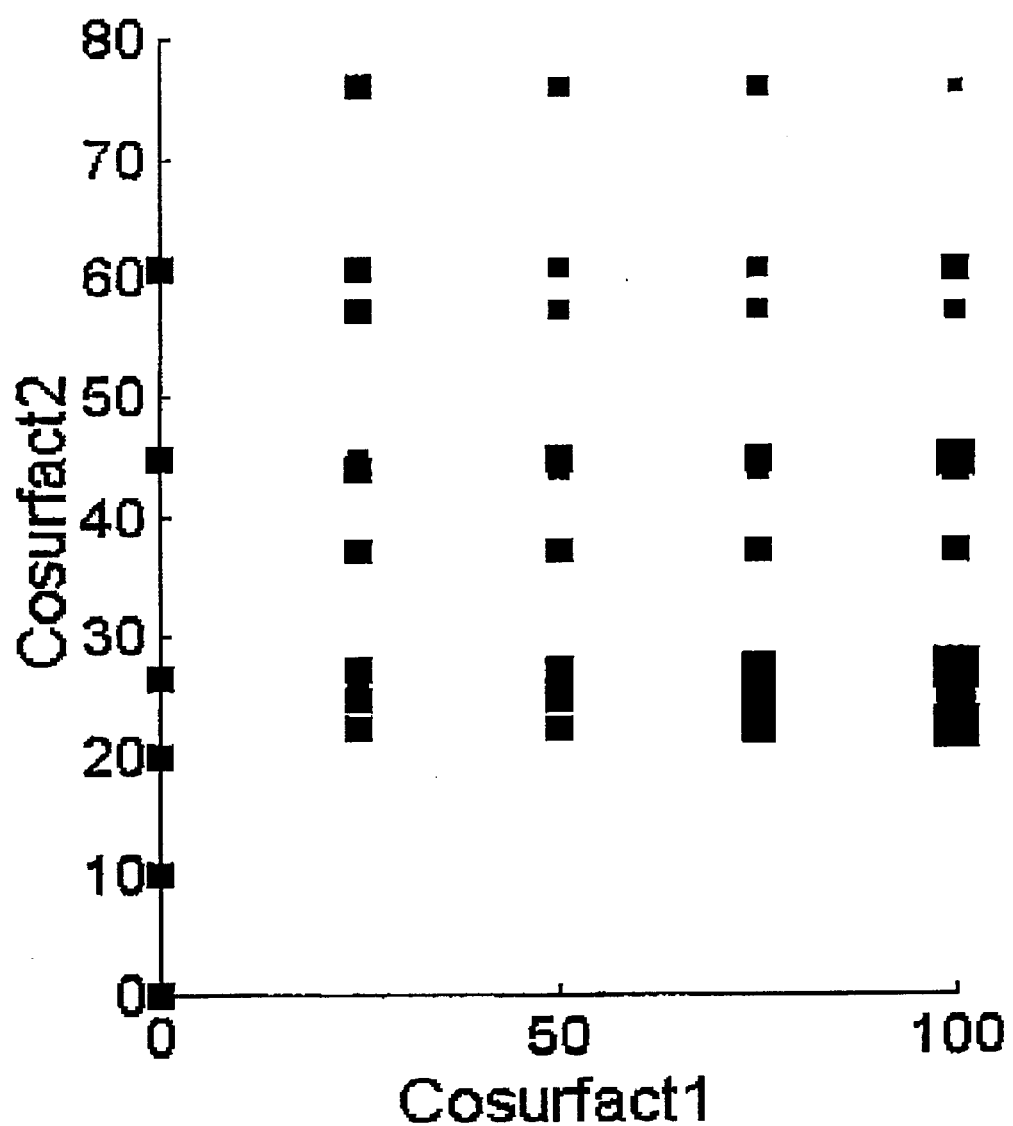

FIG. 6A shows the the comparison of the actual mildness empirical data set (left) where the input data distribution is shown and the size of the marker represents the mildness measure and the empirical Gaussian process model's response (right).

Figure 6B:
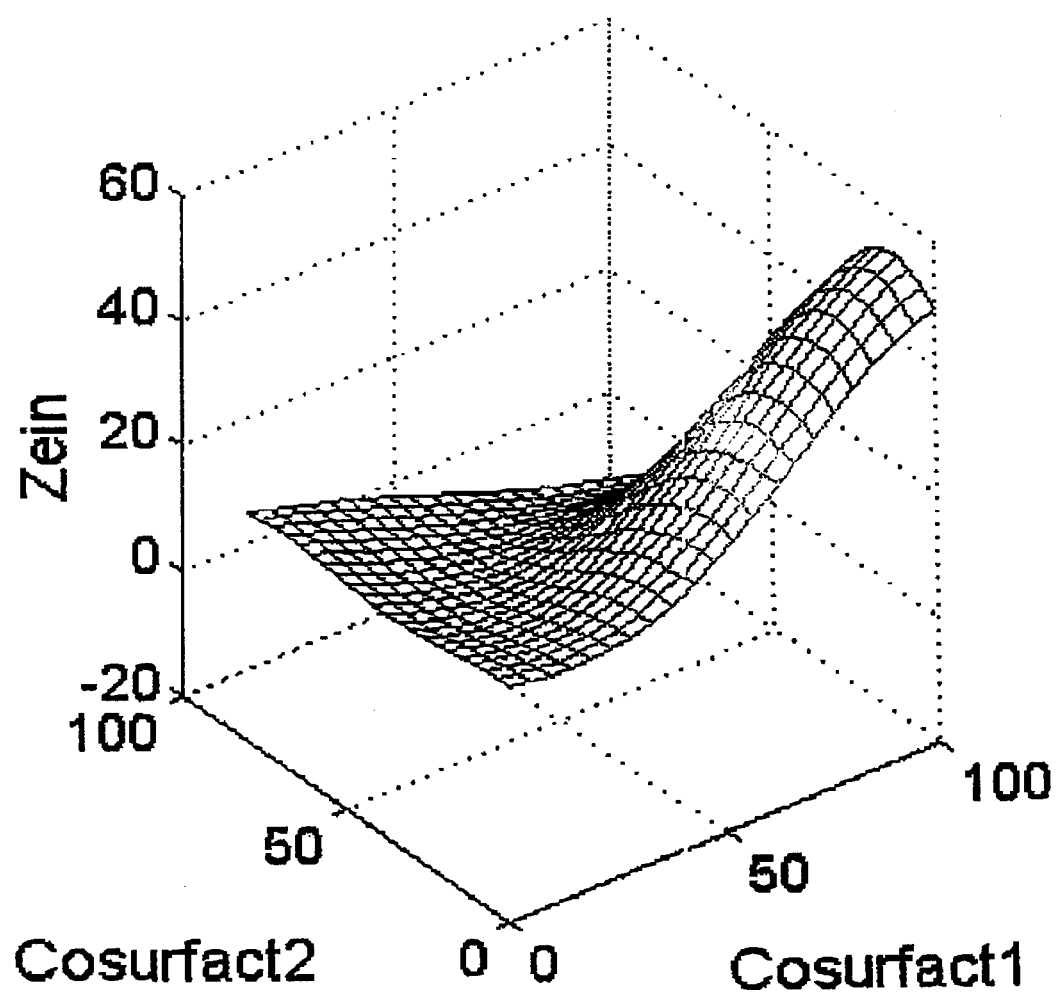

When the model is optimised to simultaneously minimise both the prediction and the corresponding error bar, the set of formulations shown in FIG. 6B is calculated. In this example, the range of the predicted error bars is fairly small, which is a consequence of having a data set where the points are distributed fairly evenly. However, when the model is unconditionally minimised, the extreme value occurs where the data is fairly sparse and the error bar is relatively large (where both ingredients are large). It is then up to the designer to decide whether they balance minimising the mildness measure with accepting the risk that the model's prediction may be inaccurate. Including error bars as objectives in the Pareto optimisation, ensures that reliable solutions are represented in the final solution set, as well as speculative values.

Figure 7A:
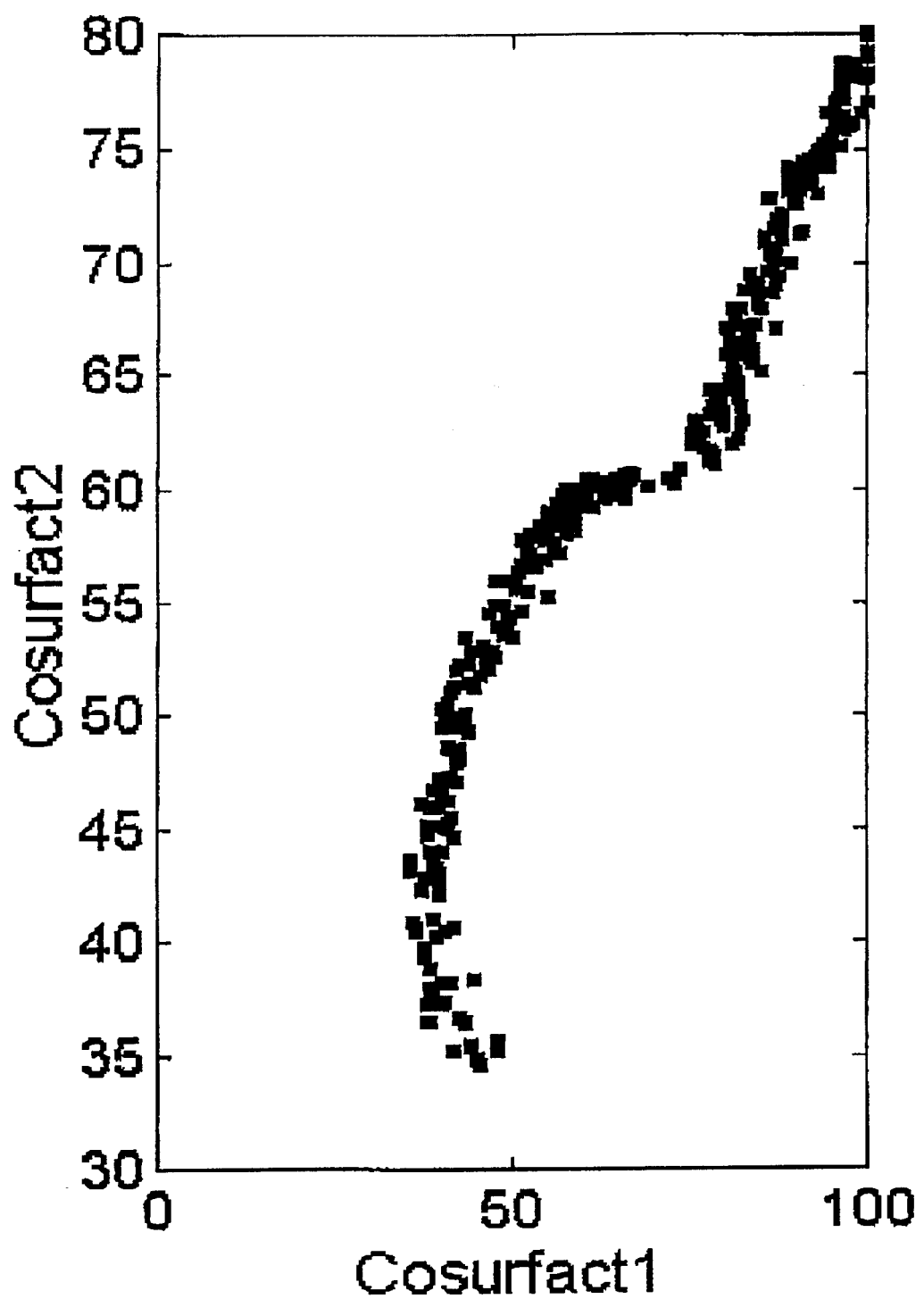
Figure 7B:
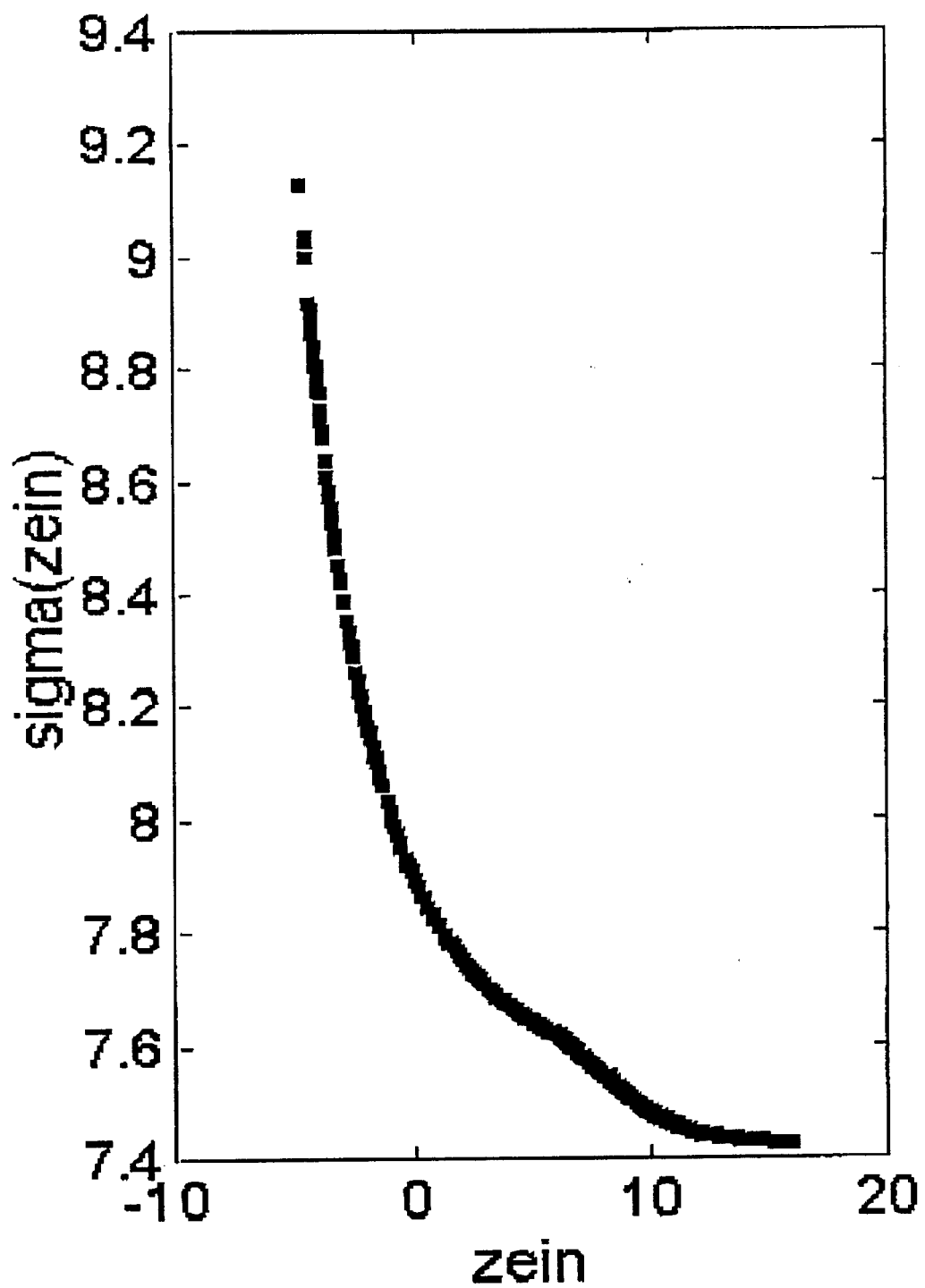

FIG. 7A shows The calculated Pareto front based on minimising the mildness measure and also minimising the corresponding error bar. The figure on the left shows the formulation values lying on the Pareto front, where as the figure on the right (7B) shows the actual Pareto front.

The invention is not restricted to the above-described embodiment which can be varied in a number of ways within the scope of the invention.

What is claimed is:

1. A computer implemented method for finding solutions to a problem dependent on a number of criteria, comprising the steps of
    i providing a model algorithm for each of the criteria, each model algorithm providing a prediction for a corresponding criteria when a candidate solution is inputted into the model algorithm and wherein at least one model algorithm provides a prediction with a prediction error bar for the corresponding criteria;
    ii selecting criteria to optimise a set of candidate solutions; and
    iii providing an algorithm for optimisation of the set of candidate solutions in accordance with the selected criteria;
wherein a first set of candidate solutions is provided,
wherein the optimisation algorithm generates one or more new candidate solutions, wherein all candidate solutions are inputted into the number of model algorithms to obtain predictions and at least one prediction error bar, and wherein information of the set of candidate solutions obtained by said generation and/or previous optimisations and/or experiments is used to select candidate solutions from the set to obtain an optimised set of candidate solutions.

2. A computer implemented method according to claim 1, including a number of iteration steps in a loop as follows:
    (i) a first set of one or more candidate formulations are used as a starting point;
    (ii) candidate solutions are inputted into the number of model algorithms to obtain predictions whereby at least one prediction includes a prediction error bar; and
    (iii) the optimisation algorithm generates new candidate solutions; and
    (iv) the new candidate formulations are used as input into the number of model algorithms in iteration step (ii); and wherein predictions and prediction error bars of the set of candidate solutions are used to select candidate solutions from the set to obtain an optimised set of candidate solutions.

3. A computer implemented method according to claim 1, wherein the optimisation algorithm generates new candidate solutions using information of the generated candidate solutions to improve the set of candidate solutions, the information comprising solutions, predictions and prediction error bars, the gradients and estimated gradients of predictions and/or prediction error bars, the constraints, and optionally any other, information available.

4. A computer implemented method according to claim 1, wherein constraints are defined regarding the candidate solutions and/or the predictions and/or the prediction error bar(s), wherein these constraints are used in the optimisation algorithm in generating the candidate solutions.

5. A computer implemented method according to claim 1, wherein candidate solutions are selected comprising predictions with minimum prediction error bars.

6. A computer implemented method according to claim 1, wherein a weighted sum(s) of prediction(s) and prediction error bar(s) of candidate solutions is(are) determined for selecting the candidate solutions.

7. A computer implemented method according to claim 1, wherein Pareto optimal sets of predictions and prediction error bars of candidate solutions are determined to select candidate solutions.

8. A computer implemented method according to claim 1, wherein the candidate solutions are displayed against selected sets of two of said number of criteria.

9. A computer implemented method according to claim((s)) 8, wherein constraints on specific criteria can be introduced during displaying the candidate solutions against these specific criteria.

10. A computer implemented method according to claim 1, wherein constraints on the criteria can be introduced in an interactive manner to filter the optimised set of candidate solutions.

11. A computer implemented method according to claim 1, wherein information of the optimised set of candidate solutions is used to determine a region of an experimental space for carrying out further experiments.

12. A computer implemented method according to claim 11, wherein the results of the further experiments are used to improve one or more of the model algorithms.

13. A computer implemented method according to claim 1, wherein a Bayesian neural network algorithm is used as a model algorithm providing a prediction and prediction error bar.

14. A computer implemented method according to claim 1, wherein the first set of candidate solutions is generated in a random manner, is seeded from previous actual solutions and/or previous candidate solutions or optimised sets of candidate solutions.

15. A computer implemented method according to claim 14, wherein candidate solutions for the first set of solutions are obtained by the method of claim 1, wherein the weighted optimisation algorithm is used.

16. A computer implemented method according to claim 1, wherein the method is used in formulation optimisation.

17. A computer implemented method according to claim 1, wherein the method is used in optimising manufacturing processes.

18. A computer program device readable by a computer, comprising a computer program executable by the computer for effecting the computer to carry out the method of claim 1.

19. A computer program in a format downloadable by a computer, comprising a computer program executable by the computer to install the program in the computer for execution to effect the computer to carry out the method of claim 1.

* * * * *